United States Patent
Wood et al.

(10) Patent No.: US 9,161,650 B2
(45) Date of Patent: Oct. 20, 2015

(54) LID LOCKING SYSTEM AND COOKING APPARATUS HAVING LID LOCK

(71) Applicants: Robert T. Wood, Tipp City, OH (US); Tim A. Landwehr, West Alexandria, OH (US)

(72) Inventors: Robert T. Wood, Tipp City, OH (US); Tim A. Landwehr, West Alexandria, OH (US)

(73) Assignee: Henny Penny Corporation, Eaton, OH (US)

( * ) Notice: Subject to any disclaimer, the term of this patent is extended or adjusted under 35 U.S.C. 154(b) by 374 days.

(21) Appl. No.: 13/621,920

(22) Filed: Sep. 18, 2012

(65) Prior Publication Data

US 2014/0076904 A1 Mar. 20, 2014

(51) Int. Cl.
*A47J 37/12* (2006.01)
*A47J 27/00* (2006.01)
*A47J 27/08* (2006.01)
*A47J 27/09* (2006.01)

(52) U.S. Cl.
CPC .......... *A47J 27/0804* (2013.01); *A47J 27/0817* (2013.01); *A47J 27/09* (2013.01)

(58) Field of Classification Search
CPC .............. A47J 27/0804; A47J 27/0806; A47J 27/0808; A47J 27/0811; A47J 27/0813; A47J 27/0815; A47J 27/0817; A47J 36/20; A47J 36/38; A47J 37/1295; A47J 37/1209; A47J 37/1247; A47J 27/08; Y10S 70/48; E05B 51/02; F16J 13/06; F16J 13/08; F16J 13/24; F16J 13/16; F16J 13/18; Y10T 292/1082; Y10T 292/0887; Y10T 292/0805; Y10T 292/1021; Y10T 292/0864; Y10T 292/225; B01J 3/03

USPC ................... 99/437, 467, 473, 474, 483, 492, 99/403–418, 324–336, 337–338, 99/339–342; 220/573.1, 315–380, 314, 220/293; 49/276, 395, 13; 292/201, 144, 6, 292/64, 58; 126/369; 426/231, 233, 438
See application file for complete search history.

(56) References Cited

U.S. PATENT DOCUMENTS

| | | | | |
|---|---|---|---|---|
| 3,065,315 A * | 11/1962 | Yosenick | ........................ | 200/47 |
| 3,113,352 A * | 12/1963 | Gibbs et al. | ..................... | 49/276 |
| 3,604,895 A * | 9/1971 | MacKay | ....................... | 219/401 |
| 3,973,481 A * | 8/1976 | Mies | ................................ | 99/408 |
| 3,976,218 A * | 8/1976 | Stoermer | ...................... | 220/316 |
| 4,119,239 A * | 10/1978 | Anderson | ..................... | 220/324 |
| 4,299,331 A * | 11/1981 | Bertola | ........................ | 220/316 |
| 4,485,936 A * | 12/1984 | Pardo et al. | .................. | 220/316 |
| 4,543,748 A * | 10/1985 | North, Jr. | ........................ | 49/395 |
| 4,840,287 A * | 6/1989 | Brewer et al. | ................ | 220/316 |
| 4,995,313 A * | 2/1991 | Delau et al. | .................... | 99/467 |
| 4,997,101 A * | 3/1991 | King et al. | .................... | 220/318 |

(Continued)

*Primary Examiner* — Dana Ross
*Assistant Examiner* — Gyounghyun Bae
(74) *Attorney, Agent, or Firm* — Baker Botts L.L.P.

(57) ABSTRACT

A cooking apparatus includes a cooking chamber for receiving a cooking medium, a lid configured to cover the cooking chamber, and a lid locking system. The lid locking system includes a pressure lock pin coupled to a movable diaphragm, an electronic lock pin coupled to the lid, and a latch. The latch includes a pressure lock pin aperture formed therein to accommodate the pressure lock pin, and an electronic lock pin aperture formed therein to accommodate the electronic lock pin. The pressure lock pin engages the latch in response to pressure in the cooking chamber exceeding a predetermined threshold, and the electronic lock pin engages the latch in response to a lock signal from a controller.

19 Claims, 7 Drawing Sheets

(56) References Cited

U.S. PATENT DOCUMENTS

| | | | |
|---|---|---|---|
| 5,768,976 A * | 6/1998 | Suk | 99/337 |
| 6,022,572 A * | 2/2000 | Winter et al. | 426/231 |
| 6,582,743 B2 * | 6/2003 | Cai | 426/510 |
| 2002/0008110 A1 * | 1/2002 | Booth et al. | 220/316 |
| 2004/0250689 A1 * | 12/2004 | De'Longhi | 99/403 |
| 2009/0120303 A1 * | 5/2009 | Popeil et al. | 99/403 |
| 2011/0259881 A1 * | 10/2011 | Jagannathan | 219/679 |

* cited by examiner

LID LOCKING SYSTEM AND COOKING APPARATUS HAVING LID LOCK

BACKGROUND OF THE INVENTION

1. Field of the Invention

The present invention relates generally to pressure cooking medium systems (e.g., pressure fryers) that use cooking media to cook product under pressure. Specifically, the present invention relates to a seal for sealing a lid to the cooking chamber to facilitate pressurized cooking.

2. Description of Related Art

Known cooking apparatus, such as pressure fryers, are used to cook various food products, e.g., poultry, fish, potato products, and the like. Such cooking apparatus may include one or more cooking chambers, e.g., fryer pots, which may be filled with a cooking medium, e.g., an oil, a liquid shortening, or a meltable-solid shortening. Such cooking apparatus also may include a heating element, e.g., an electrical heating element, such as a heating oil medium, or a gas heating element, such as a gas burner and gas conveying tubes, which heat the cooking medium in the cooking chamber. The amount of time sufficient to cook or to complete the cooking of the food product at a given cooking temperature depends on the type of food product that is cooked, In a pressure fryer, when the food product is submerged in the oil, the food product cooks, releasing heat and steam, which pressurizes the cooking chamber. The increased pressure in the cooking chamber allows for thorough cooking in reduced time, and assists in preventing drying out of the food product.

Known pressure fryer apparatus may include a lid to seal the cooking chamber once the food product has been placed inside the cooking chamber. The lid may create a seal with the chamber body that is sufficient to withstand the pressure from the cooking operation. In known cooking apparatuses, the lid may be very heavy and a locking mechanism may be employed to prevent the lid from opening while the cooking chamber is under pressure. Nevertheless, known locking mechanisms may be limited by certain operational characteristics.

SUMMARY OF THE INVENTION

Therefore, a need has arisen for systems and methods for a cooking apparatus that overcome these and other shortcomings of the related art. A lid locking system according to embodiments of the invention may include an electronic lock that may be controlled by the main cooking apparatus controller, and thus, may be implemented subject to varied operational characteristics, such as the operation or non-operation of a mechanical lock, the pressure in the cooking chamber, and the status of the cook cycle.

In an embodiment of the invention, a cooking apparatus comprises a cooking chamber configured to hold a cooking medium therein, a lid configured to cover the cooking chamber, the lid comprising a diaphragm, and a lid locking system. The lid locking system comprises a pressure lock pin coupled to the diaphragm, an electronic lock pin coupled to the lid, and a latch. The latch comprises a pressure lock pin aperture formed therein configured to accommodate the pressure lock pin, and an electronic lock pin aperture formed therein configured to accommodate the electronic lock pin. The pressure lock pin is configured to engage with the latch in response to pressure in the cooking chamber exceeding a predetermined threshold, and the electronic lock pin is configured to engage with the latch in response to a lock signal from a controller. The cooking apparatus may further comprise a pressure lock pin sensor configured to detect whether the pressure lock pin is engaged with the latch. The electronic lock pin may be configured to disengage from the latch only when the pressure lock pin sensor detects that the pressure lock pin is disengaged from the latch.

Other objects, features, and advantages of the present invention are apparent to persons of ordinary skill in the art in view of the following detailed description of embodiments of the invention and the accompanying drawings.

BRIEF DESCRIPTION OF THE DRAWINGS

For a more complete understanding of embodiments of the present invention, needs satisfied thereby, and the objects, features, and advantages thereof, reference now is made to the following description taken in connection with the accompanying drawings.

DETAILED DESCRIPTION OF EMBODIMENTS OF THE INVENTION

Figure 1:
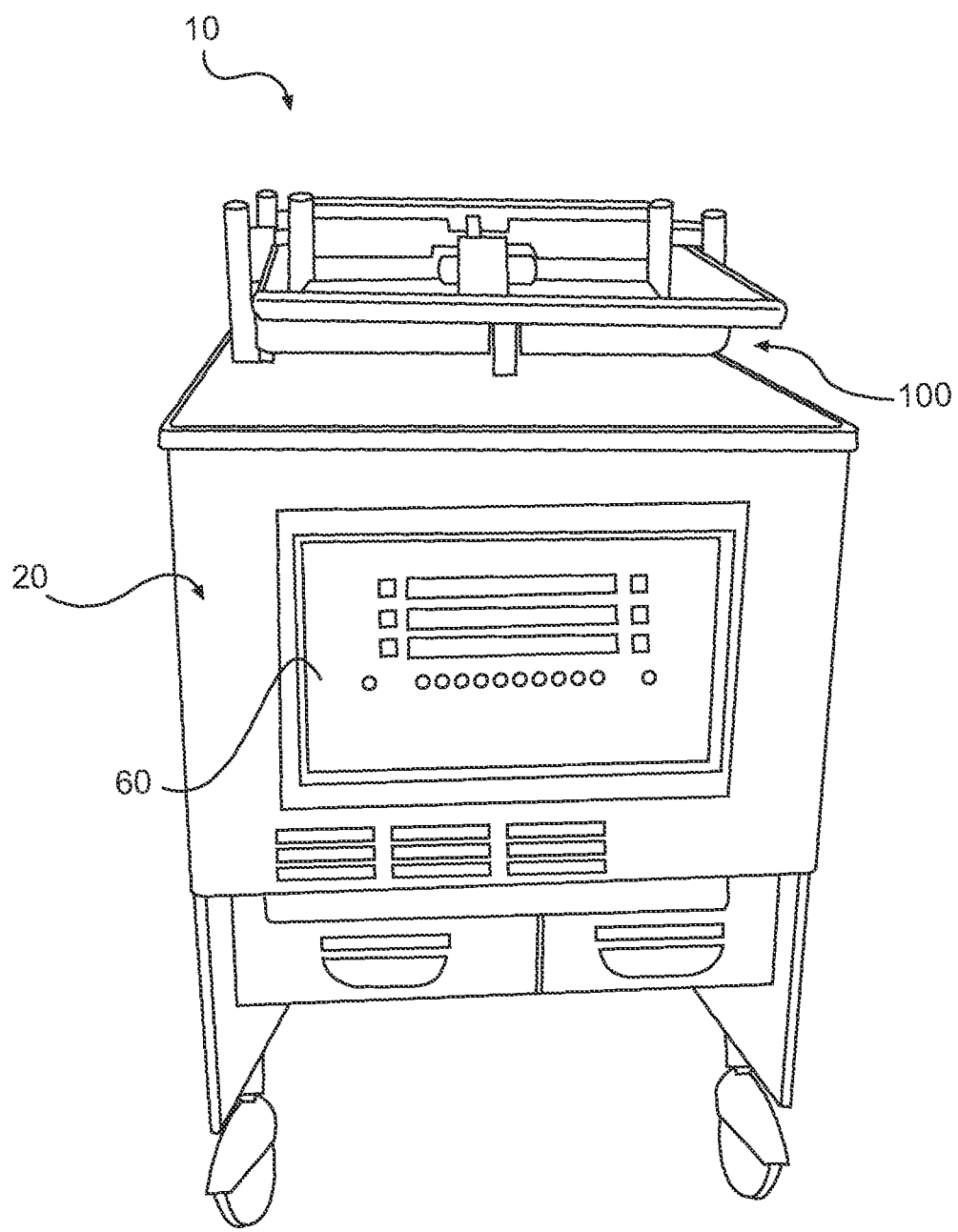
FIG. 1 is a front view of a pressure fryer, according to an embodiment of the invention.

Preferred embodiments of the present invention, and their features and advantages, may be understood by referring to FIGS. 1-7, like numerals being used for corresponding parts in the various drawings.

A cooking apparatus may include a passive locking system that may prevent the lid of a cooking chamber from being opened while the cooking chamber is under pressure. In this system, the inside surface of the lid may comprise a large, substantially flat piece of material (i.e., a lid liner) that may act as a movable diaphragm, flexing outward when the lid is closed and the cooking chamber is under pressure. A pin may be disposed in contact with the upper side of the lid liner, such that when the lid liner flexes upward due to pressure within the cooking chamber, the pin may rise and may become inserted into a bore formed in the bottom of a latch, thereby locking the lid and preventing the lid from being opened.

This passive locking system may be activated solely by pressure in the cooking chamber, and may lock the lid when the cooking chamber pressure is high enough to flex the lid liner, regardless of the status of a cook cycle of the cooking apparatus. An extension pin and sensor (e.g., limit switch, microswitch, or the like) assembly may be fitted to the top side of the lid liner lock pin system. The extension pin and sensor assembly may allow a controller of the cooking apparatus to monitor whether the pressure locking pin is in the locked or unlocked state. The controller may signal an error code if the pressure lock pin is not functioning correctly based on feedback from the sensor. The sensor may be activated when pressure in the cooking chamber causes the lid liner pin to rise into the latch, thereby raising the extension pin, which in turn activates the sensor. For example, with a microswitch, normally closed contacts may be utilized, such that when the cooking chamber is not under pressure, the controller may detect continuity on the switch; and when the cooking chamber is under pressure, the pin may rise, the switch may be pressed, and the switch may change to an open circuit condition.

The normally closed contacts may be utilized so that an unplugged cable or a broken wire may indicate a "locked" status (i.e., no continuity). For example, if a wire or a switch were to break during a cook cycle, the controller would still indicate that the lid cannot be opened. Thus, if the controller determines an open circuit on this switch while a pressure solenoid is open and a pressure transducer is indicating no pressure, the controller may determine that a cable is unplugged, a wire has broken, or the switch has failed, and an appropriate error code may be generated.

The cooking apparatus also may include an electric, computer-controlled lid locking system that may serve to supplement the passive lid locking system. The controller may cause the lid to be locked with the electric lid lock system at the start of each cook cycle, whether or not pressure has built up in the cooking chamber. The controller may cause the electric lock to be released in the last 30 seconds of the cook cycle, but only if the pressure transducer measurement and the pressure locking pin status both indicate that the lid may be opened. While the pressure in the cooking apparatus is still subsiding, the controller may keep the electric lock engaged until the other systems indicate that the lid may be opened. In addition to automatically locking the lid at the start of a cook cycle, the controller may lock the lid when the pressure transducer measurement exceeds a predetermined threshold. Thus, the electric lid lock may operate similar to the pressure lock pin by locking the lid when a predetermined level of pressure is present in the cooking chamber, regardless of whether or not a cook cycle is in progress.

The electric lid lock system may comprise a unidirectional motor, with an output shaft fitted with an arm, an off-center drive pin, and a linkage to form a crank. This crank or link assembly may be connected to a pin that may be driven into a receiving bore formed in the latch to lock the lid. The rotary motion of the motor arm may be converted to reciprocating linear motion of the locking pin, which is alternately inserted and withdrawn from the latch as the motor rotates.

The electric lid locking system may include two sensors (e.g., limit switches, or the like) that may monitor the position of the electric locking pin and provide feedback to the controller. These two sensors may be logic inputs to the controller, without being wired with the motor leads. The controller may run the motor regardless of the status of the limit switches. Thus, the two sensors may monitor the position of the locking pin itself and not the rotation of the motor. One sensor may indicate that the pin is in an "extended" position, and the other sensor may indicate that the pin is in a "retracted" position.

The locking pin may be inserted into the receiving bore formed in the latch only when the latch mechanism is in a lowered position. The latch mechanism may be in a lowered position in two situations: 1) when a lid handle is engaged in the latch and the lid is fully locked down; 2) when the lid handle is not engaged in the latch and the latch falls naturally into the lowered position. The controller may not be able to distinguish between these two conditions, and thus, may not be able to determine whether or not a cam lock bar has been moved into position and the lid has been properly closed and tightened down. If the controller sends a signal to lock the lid while the lid handle is not properly closed, the lid subsequently may not be able to be closed and locked. If the handle is partially but not fully down, the latch may be out of position and the locking pin may not be able to be inserted into the receiving bore formed in the latch. In this case, when the motor attempts to extend the pin (i.e., to lock the lid) the pin may press against the body of the latch and the motor may stall.

After a predetermined amount of time, the controller may detect that the pin has not moved forward as expected (i.e., the extended position sensor was not activated), and the controller may determine that this is because the handle is out of position. Nevertheless, a lack of activity on the two sensors also may be due to a failure of the motor or a failure of the linkage. Regardless, because the motor may be unidirectional and the controller cannot withdraw the pin, the locking pin may continue to attempt to drive forward until the handle is either fully opened or fully closed and the pin is able to extend.

The two sensors may be limit switches, for example, which may be wired using the normally closed contacts so that each switch provides continuity when not pressed, and changes to an open circuit when the locking pin travels far enough to press the switch. By using the normally closed contacts, whenever the switch is not pressed, a 24V AC signal may be returned to the controller. Accordingly, at substantially all times, at least one of the two limit switches may be sending a 24V AC signal because both switches may not be pressed at the same time. Thus, if neither limit switch is returning a 24V AC signal to the controller, an error code or signal may be generated, which may indicate, for example, that the lid cable is unplugged, a wire has broken, a limit switch has failed, or the like, or combinations thereof. Alternatively, the limit switches may be wired using the normally open contacts to sense the locking pin pressing the switch. The controller may determine the status of the locking pin (i.e., locked or unlocked) based on a signal from the two sensors.

If dirt, oil, grease, or the like accumulates on the microswitches, they may get stuck or temporarily malfunction on the release side of their operation. The "not pressed" to "pressed" transition may remain reliable because a strong, outside force may be acting on the switch; but the "pressed" to "not pressed" release may become slow and inconsistent because only the internal spring pressure of the switch may be urging the switch back to the "not pressed" state. Thus, when dirt, oil, grease, or the like substantially accumulates on the lever or boot of the microswitch, for example, the switch may continue to indicate a "pressed" state for a period of time after the switch has been physically released when the locking pin retracts. Therefore, the controller may be configured to monitor the transitions of the limit switches from the "not pressed" to "pressed" states when the locking pin moves far enough to make contact with a limit switch to determine the status of the locking pin. Because the controller may be configured to control the system based on the transitions of the limit switches rather than the static levels of the switches, the system may be better able to deal with switches that exhibit a slow release, or switches that are continually locked on or continually off or disconnected.

According to embodiments of the invention, several component errors or failures may be detected, and the controller may generate an error signal or code and may execute contingency operations in response to the errors or failures. For example, if one of the limit switches fails but the other limit switch remains working properly, the controller may position the locking pin at the nonworking limit switch by causing the motor to run for one half revolution time, from the working limit switch. In another example, if the handle is only partially closed when the controller sends a signal to lock the lid, the locking pin may not be able to extend into the bore formed in the latch and instead may contact the body of the latch. In this case, after a time, the controller may determine that the lack of activity on either limit switch indicates the occurrence of an error, such as the motor has died, the linkage is broken, both limit switches are broken, the latch is out of position, or the like, or combinations thereof. For example, if the motor fails to turn when the controller attempts to cause the motor to turn, or the motor turns but the linkage to the locking pin is disconnected, the controller may determine no activity on the limit switch inputs because the locking pin fails to move.

In an embodiment of the invention, one of the limit switches may indicate that the locking pin is fully extended ("the EXT limit switch") and therefore is presumably, but not assuredly, inserted into the latch. If the lid handle is either in the fully locked position or in the fully unlocked position, the locking pin may be able to travel into the receiving bore in the latch. If the EXT limit switch fails or malfunctions, the controller may be unable to determine whether the electric locking pin has locked the lid because the lack of a transition on the EXT limit switch signal may fail to confirm that the locking pin is in the extended position. Without this confirmation, the controller may continue to cause the motor to run. Nevertheless, if the pin actually does insert into the bore formed in the latch and the motor is kept running, the pin eventually may retract from the bore and pull back to the "retracted" position, activating the other limit switch that may indicate that the locking pin is retracted ("the RET switch"). In response to this transition on the RET limit switch, the controller may determine that the pin is moving and not jammed against the latch body, the motor has not failed, and the linkage has not failed. Based on the activation of the RET limit switch while extending the pin, the controller may determine that the locking pin has made a complete cycle, returning to the retracted position. In this case, the controller may determine that the EXT limit switch has failed and the controller may activate a contingency mode to drive the pin into the latch by causing the motor to run for an additional one half of a revolution time from the activation of the RET limit switch, and then turning the motor off. Accordingly, the locking pin may be positioned into the locked position.

The RET limit switch may indicate that the locking pin is fully retracted and, therefore, the lid is unlocked. When unlocking the lid, the controller may cause the motor to run until the initial-contact transition is detected on the RET limit switch. If the RET limit switch fails or malfunctions, the controller may continue to run the motor, and eventually the pin may begin to extend again. If the handle is either in the fully locked position or in the fully unlocked position, the pin may continue to travel back into the receiving bore formed in the latch, eventually activating the EXT limit switch. In response to a transition on the EXT limit switch, the controller may determine that the locking pin is moving and is not caught in the latch body receiving bore (i.e., unable to retract), the motor has not failed, and the linkage has not failed. Based on activation of the EXT limit switch while retracting the pin, the controller may determine that the locking pin has made a complete cycle, returning to the extended position. In this case, the controller may determine that the RET limit switch has failed and may activate a contingency mode to retract the pin to the unlocked position by running the motor for an additional half of a revolution time from the activation of the EXT limit switch, and then turning the motor off. Accordingly, the locking pin may be positioned into the fully unlocked position.

If both limit switches fail or malfunction, the controller may be unable to determine the position of the locking pin. Nevertheless, detecting no activity from either limit switch may also occur when the controller sends a lock signal to lock the lid when the handle is not fully closed. In other words, the controller may be attempting to cause the locking pin to extend, but the pin may be unable to be inserted into the receiving bore and instead may be jammed against the body of the latch. A message may be displayed to prompt a user to push the handle all the way down, especially if this condition exists at the start of a cook cycle.

If the switch that monitors the passive lid lock system fails, the controller may detect the problem and may generate an error code or signal. For example, when the pressure solenoid is open and the pressure transducer indicates zero pressure, the lid liner pin monitoring switch may provide continuity; and if it does not, the controller may generate an error code or signal. In another example, if the pressure transducer indicates a pressure level beyond the threshold at which the lid liner pin should engage and the lid liner pin monitoring switch does not transition to the open circuit condition, the controller may generate an error code or signal. In a further example, if the lid liner monitoring switch activates under pressure, but activates late (i.e., at a pressure level beyond the threshold at which the lid liner pin should engage), the controller may generate an error code or signal indicating such. Similarly, if the lid liner pin slays locked longer than it should on the release side (i.e., at a pressure level below the level at which the lid liner pin should disengage), the controller may generate an error code or signal indicating such. In all of these examples, the controller may also log each error code or signal, for example, by storing data related to the error code or signal in a memory.

As depicted in FIG. 1, a cooking apparatus 10 may comprise a cooking chamber 20, which may contain at least one heating element (not shown) and may be at least partially filled with a cooking medium. Cooking apparatus 10 may have a control panel 60, which may receive input of commands to cooking apparatus 10, and which may display information regarding the status of cooking apparatus 10. A controller (not shown) may control the input from and output to control panel 60, and may control the elements of cooking apparatus 10. Cooking apparatus 10 also may have a lid 100.

Figure 2:
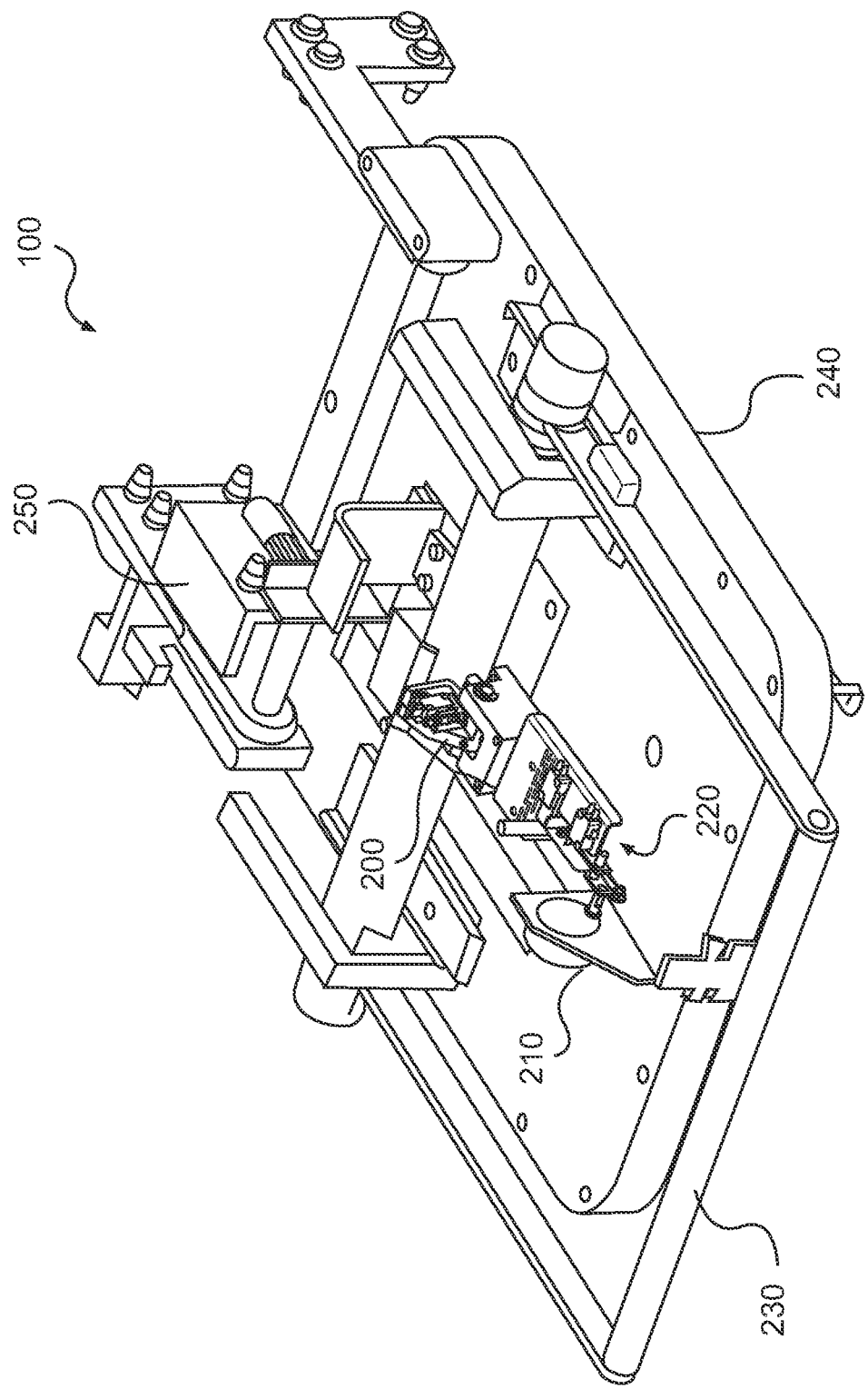
FIG. 2 is a perspective view of a lid, according to an embodiment of the invention.

Referring to FIG. 2, a lid 100 may include a latch body 200 and an electronic locking pin system 220 with a motor 210. Lid 100 may further include a diaphragm 240 on its underside and a lid handle 230 which may be capable of pivoting from a down position to a raised position. A terminal block 250 also may be disposed on lid 100. A pressure lock pin may be coupled to diaphragm 240 and may be configured to enter an opening formed in the bottom of latch body 200.

Figure 3:
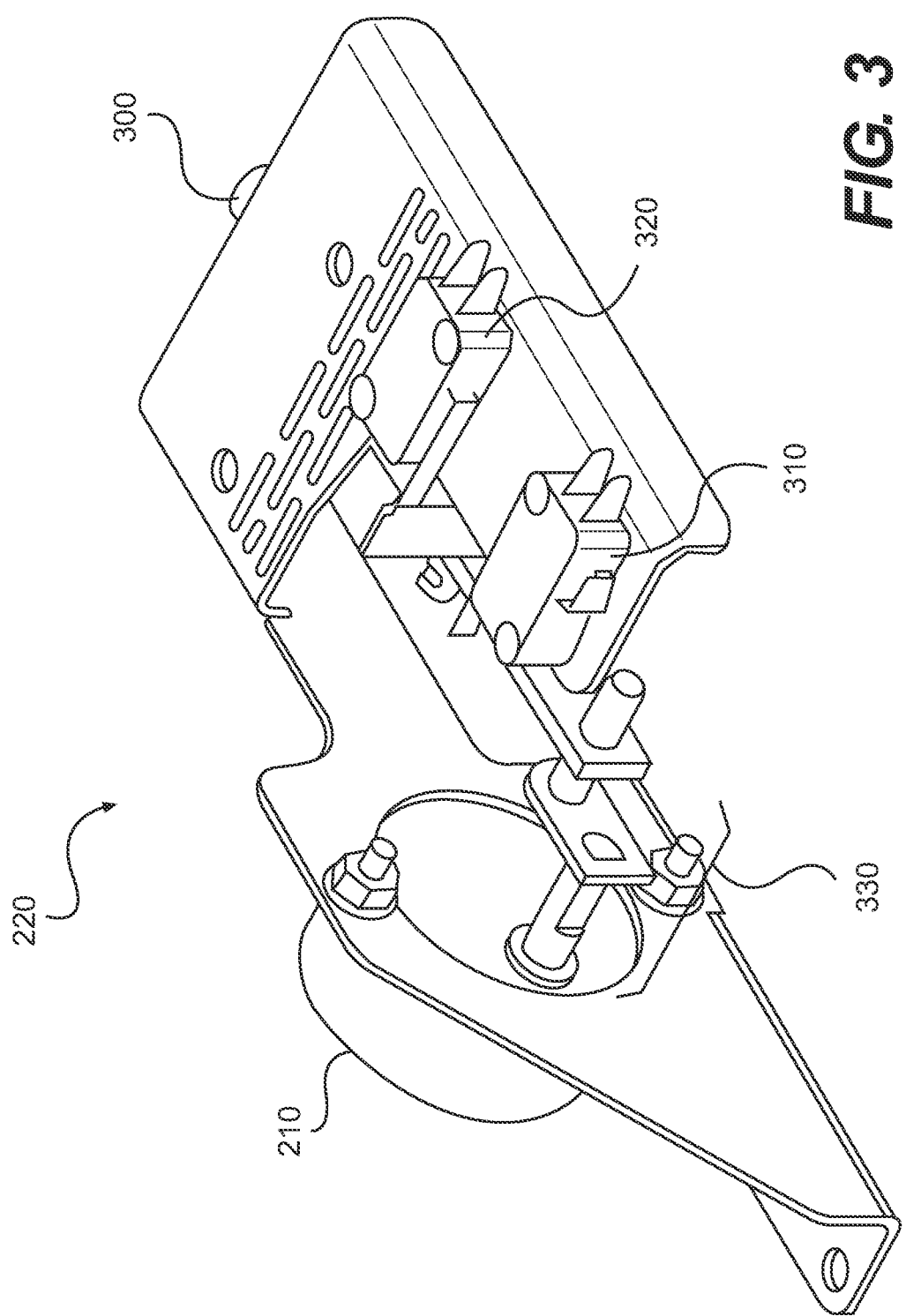
FIG. 3 is a perspective view of an electronic pin assembly, according to an embodiment of the invention.

Referring to FIG. 3, an electronic locking pin system 220 may be disposed on an upper surface of lid 100. Electronic locking pin system 220 may include a locking pin 300, sensors 310 and 320, motor 210, and a linkage 330 linking locking pin 300 with motor 210. When motor 210 is driven, a driving force may be transferred, through linkage 330, to locking pin 300 to move locking pin 300 forward and backward along its longitudinal axis between a retracted position and an extended position. Sensors 310 and 320 may be, for example, limit switches. Sensor 310 may be used to detect when locking pin 300 is in a retracted position, and sensor 320 may be used to detect when locking pin 300 is in an extended position. The extended position of locking pin 300 may be a locked position, and the retracted position of locking pin 300 may be an unlocked position.

Figure 4:
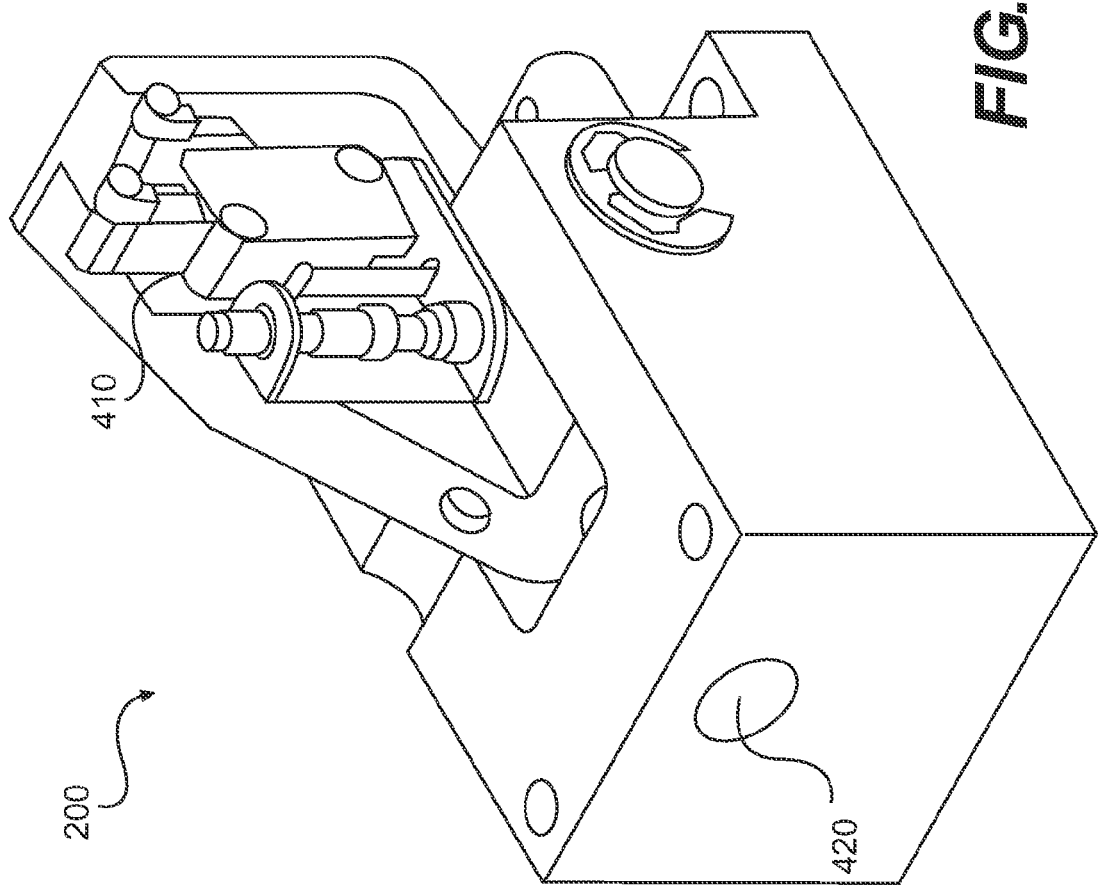
FIG. 4 is a perspective view of a latch body, according to an embodiment of the invention.

Referring to FIG. 4, latch body 200 may be disposed on an upper surface of lid 100. Latch body 200 may include a sensor 410 for detecting the position of the pressure lock pin that is coupled to diaphragm 240. Sensor 410 may be, for example, a limit switch. A passageway 420 may be formed in latch body 200 that corresponds to the size and location of locking pin 300. Thus, latch body 200 may accommodate locking pin 300 through passageway 420, while allowing movement of locking pin 300 forward and backward along its longitudinal axis.

Figure 5:
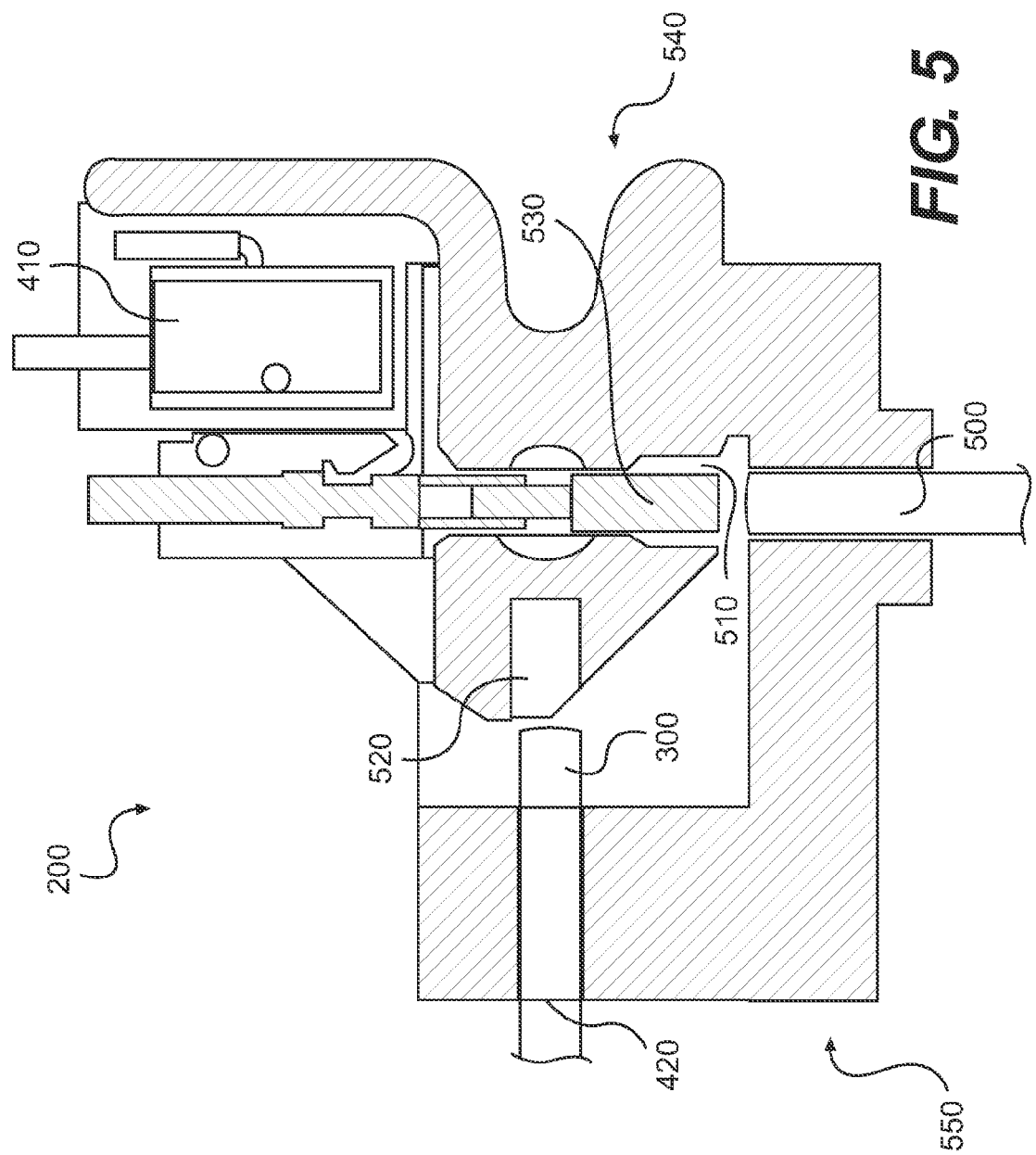
FIG. 5 is a cross-sectional view of the latch body of FIG. 4.

As depicted in FIG. 5, latch body 200 may comprise a latch 540 and a main body 550. A bore or aperture 520 may be formed in latch 540 that corresponds to passageway 420, and aperture 520 also may correspond to the size and location of electronic locking pin 300. Accordingly, locking pin 300 may enter aperture 520 of latch body 200, when locking pin 300 is moved to its extended position, to lock lid 100 in its closed position. In addition to aperture 520 formed in latch body 200, another bore or aperture 510 also may be formed in latch body 200. Aperture 510 may correspond to the size and location of the pressure locking pin 500, which is coupled to diaphragm 240. Aperture 510 and aperture 520 may be arranged in latch body 200, such that aperture 510 and aperture 520 each extend substantially orthogonally to each other. When pressure builds in cooking chamber 20, diaphragm 240 may flex, causing pressure locking pin 500 to extend and enter aperture 510, thereby locking lid 100 in its closed position. When the pressure locking pin is extended and enters aperture 510, the pressure locking pin may contact a pin contact 530, which may activate sensor 410. Accordingly, sensor 410 may be used to determine the position of pressure locking pin 500, and thus, determine whether lid 100 is locked in a closed position.

Figure 6:
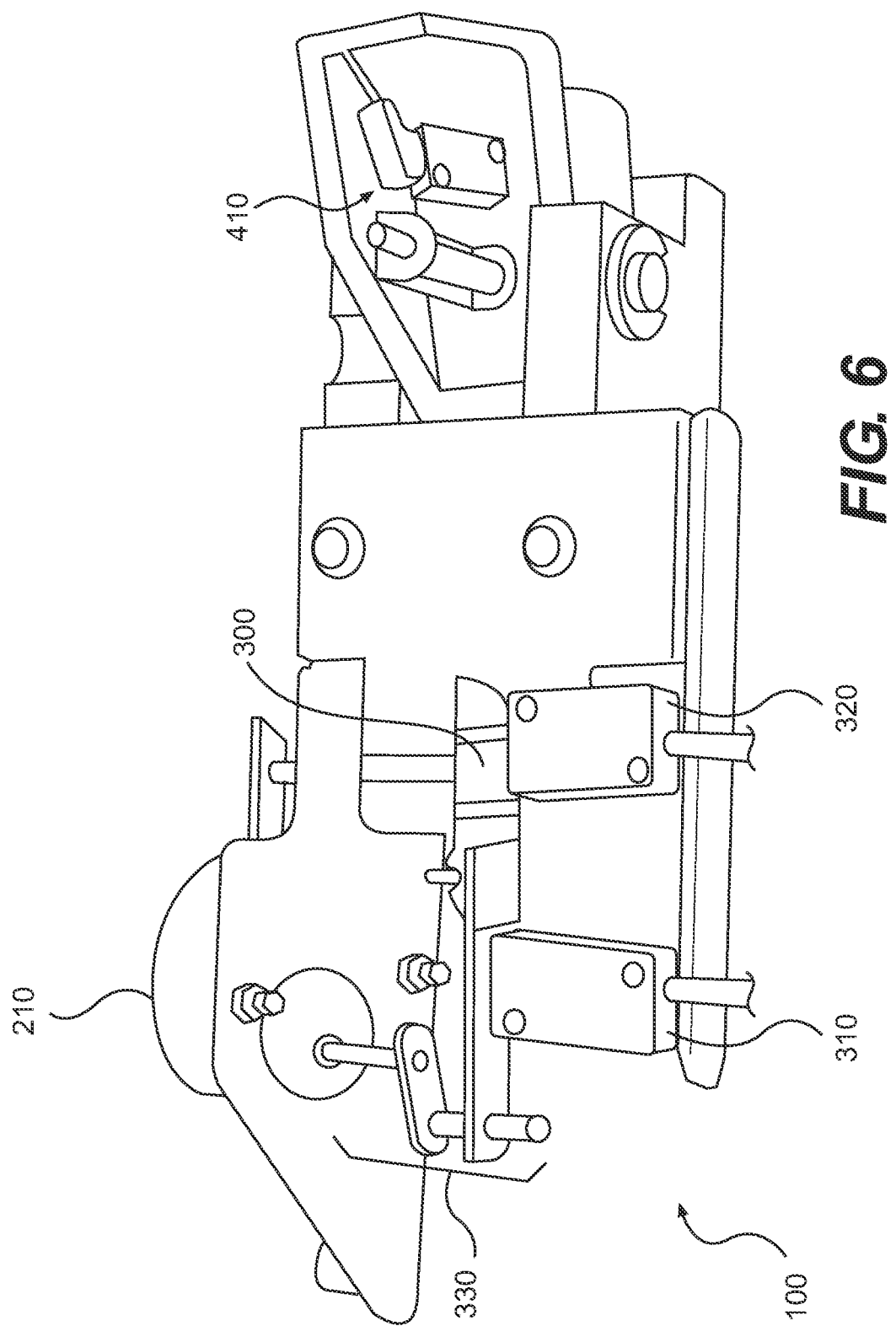
FIG. 6 is a side perspective view of a lid locking system, according to an embodiment of the invention.

Referring to FIG. 6, electronic locking pin system 220 and latch body 200 are depicted on an upper surface of lid 100. Motor 210 may be driven and a driving force may be transferred to locking pin 300 through linkage 330 to move locking pin 300 forward and backward along its longitudinal axis between a retracted position and an extended position. Sensor 310 may be used to detect when locking pin 300 is in a retracted or unlocked position, and sensor 320 may be used to detect when locking pin 300 is in an extended or locked position. Sensor 410 on latch body 200 may be used to detect the position of pressure locking pin 500, which is coupled to diaphragm 240 of lid 100.

Figure 7:
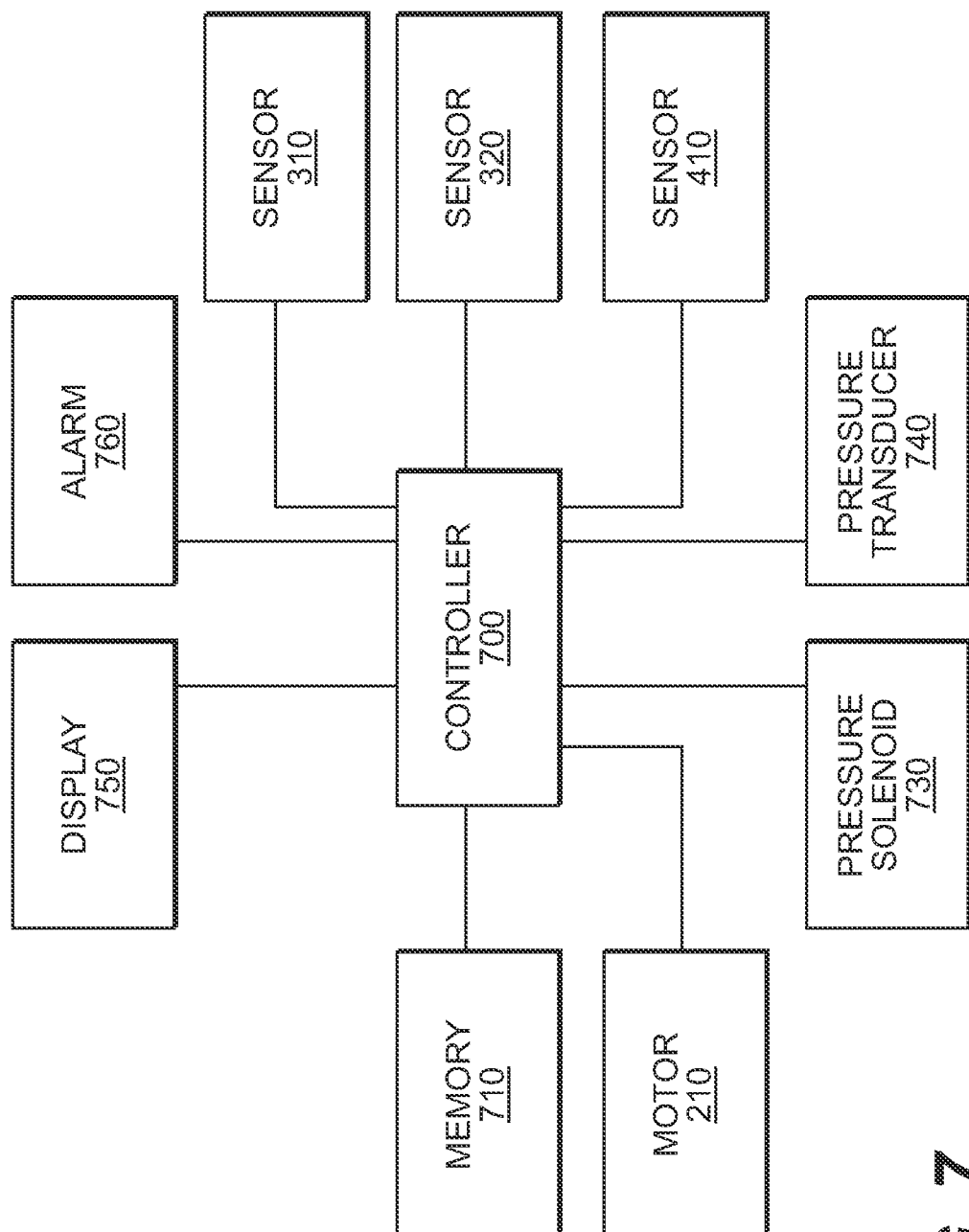
FIG. 7 is a system diagram of a cooking apparatus with a lid locking system, according to an embodiment of the invention.

Referring to FIG. 7 a system diagram depicts a configuration of a cooking apparatus with a lid locking system. The system may include a controller 700 for controlling operation of cooking apparatus 10. Sensors 310, 320, and 410 may each send respective signals to controller 700. As discussed above, sensor 310 may signal that electronic locking pin 300 is in a retracted or unlocked position and sensor 320 may signal that locking pin 300 is in an extended or locked position. Further, sensor 410 may signal that pressure locking pin 500 is in an extended or locked position. Thus, controller 700 may determine whether electronic locking pin 300 is in an extended position, a retracted position, or any position therebetween. Controller 700 also may determine whether pressure locking pin 500 is in an extended position. Accordingly, controller 700 may determine whether lid 100 is in a locked or unlocked state. Further, controller 700 may cause motor 210 to run or stop running throughout operation of the system, according to the determined current status of the system.

As discussed above, if an error or malfunction occurs, controller 700 may detect the error or malfunction and display a warning, instructions, a status, or combinations thereof on a display 750. The system also may include an alarm 760, which may be, for example, an audible alarm, a visible alarm, or the like, or combinations thereof. A memory 710 may store a log of determined errors or malfunctions, as well as data related to the operation of the system. Memory 710 may also store a program or instructions for the operation of the system, which may be executed by controller 700.

A pressure solenoid 730 may be used to regulate the pressure in cooking chamber 20. Controller 700 may be configured to determine whether pressure solenoid 730 is in its open or closed state. A pressure transducer 740 may be used to determine the pressure in cooking chamber 20. Controller 700 may determine the current pressure in cooking chamber 20 based on feedback from pressure transducer 740 and may be configured to control operation of the lid locking system based on the determined pressure in cooking chamber 20.

According to embodiments of the invention, a control-activated, electrically-powered lock may be implemented in addition to a pressure-activated, mechanical lock. The two locks, operating in tandem, may ensure proper locking of the lid of a cooking apparatus. Additionally, the operation of the control-activated, electrically-powered lock may be more easily controlled, such that operation may be made subject to certain inputs or conditions, that may not be available for the mechanical lock alone, such as indications from position sensors, indications from pressure transducers, or the like, or combinations thereof.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A cooking apparatus comprising:
   a cooking chamber configured to receive a cooking medium therein;
   a lid configured to cover the cooking chamber, the lid comprising a diaphragm; and
   a lid locking system comprising:
      a pressure lock pin coupled to the diaphragm;
      an electronic lock pin coupled to the lid; and
      a latch comprising:
         a pressure lock pin aperture formed therein configured to accommodate the pressure lock pin, and
         an electronic lock pin aperture firmed therein configured to accommodate the electronic lock pin,
      wherein the pressure lock pin is configured to automatically engage with the pressure lock pin aperture in response to flexing of the diaphragm when pressure in the cooking chamber exceeds a predetermined threshold, and the electronic lock pin is configured to selectively engage with electronic lock pin aperture in response to a lock signal from a controller generated in response to at least one of a cook cycle start and feedback from a pressure sensor configured to detect when the pressure in the cooking chamber exceeds another predetermined threshold.

2. The cooking apparatus of claim 1, further comprising:
   a pressure lock pin sensor configured to detect whether the pressure lock pin is engaged with the latch,
   wherein the electronic lock pin is configured to disengage from the latch when the pressure lock pin sensor detects that the pressure lock pin is disengaged from the latch.

3. The cooking apparatus of claim 2, wherein the pressure lock pin sensor is a limit switch wired with normally closed contacts.

4. The cooking apparatus of claim 1, wherein the predetermined threshold is substantially equal to the another predetermined threshold.

5. The cooking apparatus of claim 1, wherein the lid locking system further comprises:
   a motor configured to receive a drive signal generated by the controller; and
   a link assembly configured to transfer a driving force from the motor to move the electronic lock pin.

6. The cooking apparatus of claim 1, wherein the lid locking system further comprises:
   a first electronic lock pin sensor configured to detect whether the electronic lock pin is in an extended position engaged with the electronic lock pin aperture.

7. The cooking apparatus of claim 6, wherein the lid locking system further comprises:
   a second electronic lock pin sensor configured to detect whether the electronic lock pin is in a retracted position not engaged with the electronic lock pin aperture.

8. The cooking apparatus of claim 7, wherein the first electronic lock pin sensor and the second electronic lock pin sensor are limit switches.

9. The cooking apparatus of claim 7, wherein the controller is further configured to determine that at least one of the first electronic lock pin sensor and the second electronic lock pin sensor is malfunctioning, and to generate, in response to determining the malfunctioning, at least one of: an error message to be displayed, an alarm signal, and an error log stored in a memory.

10. The cooking apparatus of claim 7, wherein the controller is further configured to determine that one of the first electronic lock pin sensor and the second electronic lock pin sensor is a malfunctioning sensor and that the other of the first electronic lock pin sensor and the second electronic lock pin sensor is a functioning sensor, and to position the electronic lock pin at the malfunctioning sensor by causing a motor to run for one half revolution time from when a signal is returned from the functioning sensor.

11. The cooking apparatus of claim 1, wherein the latch is configured to prevent the electronic lock pin from being inserted into the electronic lock pin aperture when the latch is not in a lowered position.

12. The cooking apparatus of claim 1, wherein the pressure lock pin aperture and the electronic lock pin aperture extend substantially orthogonally to each other.

13. A lid locking system for locking a lid of a cooking chamber, comprising:
   a pressure lock pin coupled to a diaphragm of the lid;
   an electronic lock pin coupled to the lid; and
   a latch comprising:
      a pressure lock pin aperture formed therein configured to accommodate the pressure lock pin, and
      an electronic lock pin aperture formed therein configured to accommodate the electronic lock pin,
   wherein the pressure lock pin is configured to automatically engage with the pressure lock pin aperture in response to flexing of the diaphragm when pressure in the cooking chamber exceeds a predetermined threshold, and the electronic lock pin is configured to selectively engage with electronic lock pin aperture in response to a lock signal from a controller generated in response to at least one of a cook cycle start and feedback from a pressure sensor configured to detect when the pressure in the cooking chamber exceeds another predetermined threshold.

14. The lid locking system of claim 13, further comprising:
   a pressure lock pin sensor configured to detect whether the pressure lock pin is engaged with the latch,
   wherein the electronic lock pin is configured to disengage from the latch when the pressure lock pin sensor detects that the pressure lock pin is disengaged from the latch.

15. The lid locking system of claim 13, wherein the the predetermined threshold is substantially equal to the another predetermined threshold.

16. The lid locking system of claim 13, further comprising:
   a motor configured to receive a drive signal generated by the controller; and
   a link assembly configured to transfer a driving force from the motor to move the electronic lock pin.

17. The lid locking system of claim 13, further comprising:
   a first electronic lock pin sensor configured to detect whether the electronic lock pin is in an extended position engaged with the electronic lock pin aperture.

18. The lid locking system of claim 17, further comprising:
   a second electronic lock pin sensor configured to detect whether the electronic lock pin is in a retracted position not engaged with the electronic lock pin aperture.

19. The lid locking system of claim 13, wherein the pressure lock pin aperture and the electronic lock pin aperture extend substantially orthogonally to each other.

* * * * *